J. F. PETERS.
POLYPHASE REACTANCE COIL.
APPLICATION FILED OCT. 3, 1914.

1,204,817.

Patented Nov. 14, 1916.
2 SHEETS—SHEET 1.

WITNESSES:
Fred A. Lind
Geo. W. Hansen

INVENTOR
John F. Peters
BY
Wiley G. Carr
ATTORNEY

J. F. PETERS.
POLYPHASE REACTANCE COIL.
APPLICATION FILED OCT. 3, 1914.

1,204,817.

Patented Nov. 14, 1916.
2 SHEETS—SHEET 2.

WITNESSES:
Fred. A. Lind
Geo. W. Hansen

INVENTOR
John F. Peters
BY
Wiley G. Carr
ATTORNEY

UNITED STATES PATENT OFFICE.

JOHN F. PETERS, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

POLYPHASE REACTANCE-COIL.

1,204,817.  Specification of Letters Patent.  Patented Nov. 14, 1916.

Application filed October 3, 1914. Serial No. 864,728.

*To all whom it may concern:*

Be it known that I, JOHN F. PETERS, a citizen of the United States, and a resident of Edgewood Park, in the county of Allegheny and State of Pennsylvania, have invented a new and useful Improvement in Polyphase Reactance-Coils, of which the following is a specification.

My invention relates to current-limiting reactance coils, and it has special reference to reactance coils which are adapted to be inserted in polyphase circuits to limit to safe values the abnormal current flow therein that may be occasioned by short circuits or any other unusual conditions conducive to the flow of abnormally high currents.

Heretofore, in polyphase power systems, and particularly in three-phase systems, it has been necessary to insert a reactance coil comprising a single unit in each conductor of the system. These separate coils were spaced apart and grouped either in an equilateral formation, or in a straight line to minimize and balance the mutual effects between the coils during short circuits. Inasmuch as each coil was depended upon to limit, to a safe value, the short circuit current flowing in its associated conductor, it was necessary to make each coil of a substantially large size, thereby adding considerably to the cost of installing the electrical distributing system. Again, the coils being spaced apart substantially large distances from one another, required considerable floor space for their proper installation.

By means of my present invention, I superpose the coils upon one another and connect them in circuit in such manner as to utilize their mutual electromagnetic inductive effects and thereby reduce the size of the coils and the cost of furnishing protective devices for a power system.

Another advantage accruing from the use of my invention is a reduction in the amount of floor space required for installing polyphase reactance coils which will insure adequate protection to the electrical system.

Figure 2:
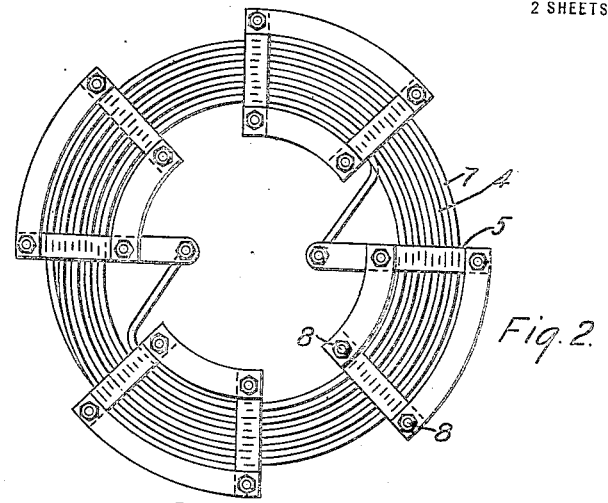
Figure 1:
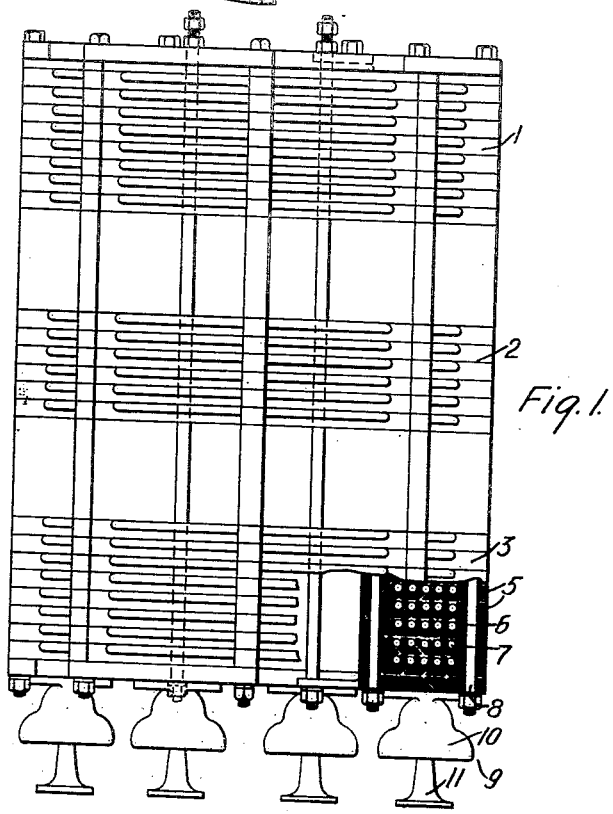
Figure 3:
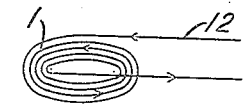
Figure 3:
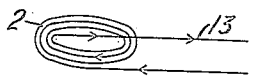
Figure 3:
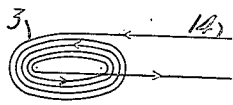
Figure 4:
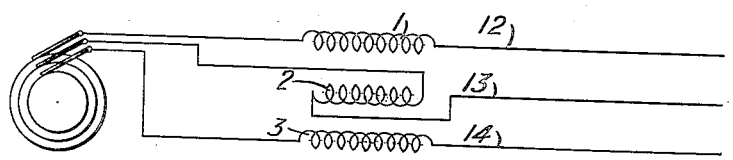
Figure 5:
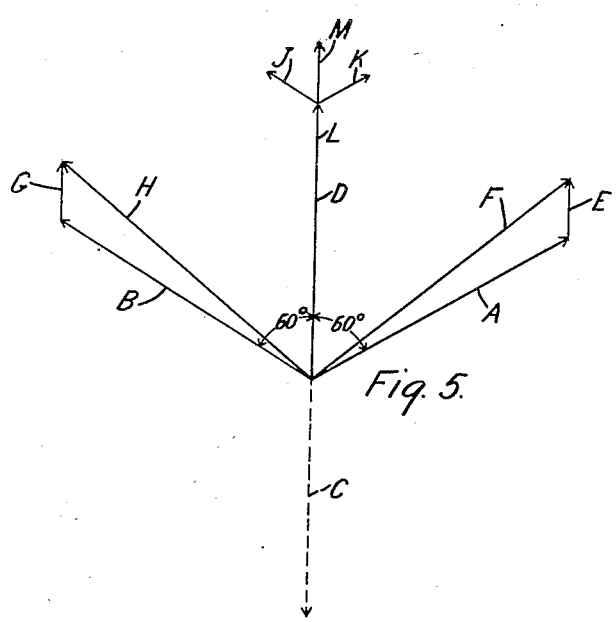

In order to understand my invention more fully, reference may be had to the following description and the accompanying drawings in which—Figure 1 is a view, partially in elevation and partially in section, of a three-phase reactance coil constructed in accordance with my invention; Fig. 2 is a plan view of the coil shown in Fig. 1; Fig. 3 is a diagrammatic view showing the direction of the instantaneous current flow in the three-coil units comprising my polyphase reactance coil; Fig. 4 is a diagrammatic representation of a power distributing system in which my reactance coil is connected in circuit, and Fig. 5 is a vector diagram of the induced electromotive forces obtaining in the coil sections.

Referring to Figs. 1 and 2, a plurality of reactance-coil units 1, 2 and 3, each comprising a group of flat parallel spirals 4, (shown in Fig. 2) are superposed upon, and spaced from, one another substantially as shown in Fig. 1. Radially extending cleats 5 provided with recesses 6 formed in one face thereof receive the conductors 7. The cleats 5 brace the coils against the internal mechanical stresses set up between the various coil units and the flat parallel spirals when short-circuit currents flow therethrough. In addition, the cleats also space the various convolutions or turns from one another, thereby greatly facilitating in the ventilation of the coil. Longitudinally extending tie-bolts 8, projecting through openings in the extremities of the cleats 5, hold the coil units in fixed relation to one another and brace the spirals against the external mutual stresses existing therebetween. Insulating supports 9, comprising porcelain caps 10 and cast iron feet 11, prevent the coil from grounding on the bed plate or floor upon which it may be disposed.

Inasmuch as it is desirable for power-limiting reactance coils to offer minimum reactance to the load currents and considerable reactance to the short-circuit or abnormally large currents, it is usual to provide non-magnetizable cores for the coils. Air cores or cores of non-magnetizable material which will impart straight-line characteristics to the coils are usually preferred. Under certain conditions, it may be more economical to provide iron cores for reactance coils of substantially high impedance. However, I prefer to use air cores when possible to do so, and therefore, have shown my structure so provided. Air cores assist in ventilating the coils and in rapidly dissipating the generated heat, in addition to greatly decreasing the total weight of the coil. Moreover, I have shown in the figures, coils wound with single conductors. But, when the currents are of such a value as to preclude the use of a comparatively small-diameter conductor, I desire to use a plurality of copper strands connected in parallel relation, in order to facilitate the winding of my coil.

Since the electromotive forces impressed by reactance coils upon the phases of a polyphase system, under normal operating conditions, are small percentages of the operating voltages, it is permissible, in most cases, to have the voltages impressed by the reactance coils slightly unequal or slightly out of phase with the main voltages. This unequalization of the operating voltages may be easily remedied by inserting induction regulators in the distributing mains, such as are extensively used. In my present reactance coil, the coil units may be so designed that the voltages impressed thereby upon each of the power conductors are equal but slightly out of phase with the main operating voltage, as will be hereinafter described.

Referring to Figs. 3, 4 and 5, the top coil 1 is connected in series relationship with a power conductor 12; the intermediate coil 2 is connected in series relationship with a power conductor 13, and the bottom coil 3 is connected in series relationship with a power conductor 14. The arrows in Fig. 3 indicate the direction of the instantaneous current flow through each of said coil units. It will be noted that the instantaneous flow of current through the coil 2 is in an opposite direction to that in the coil units 1 and 3. To accomplish this, the coil unit 2 is reversely connected in circuit with respect to the coil units 1 and 3, as shown in Fig. 4. The coil unit 2, which is disposed intermediate the coil units 1 and 3 and spaced a predetermined distance from each of them, is inductively related thereto. As a consequence, the number of turns in the coil unit 2 is less than the number of turns in each of the coil units 1 and 3, because the self-induced electromotive force of the coil unit 2 is assisted by the electromotive forces induced therein by the coil sections 1 and 3.

The electromotive force in the coil unit 1 is due to its self inductance and to the mutual inductance between it and the coil unit 2 which is adjacently disposed. Correspondingly, the electromotive force in the coil unit 3 is the resultant of its self-induced electromotive force and that due to the mutual inductance between it and the coil unit 2. Similarly, the resultant electromotive force of the coil unit 2 has, as its components, its self-induced electromotive force and the electromotive force resulting from the mutual inductance between it and the coil units 1 and 3. The coil units 1 and 3, being spaced from each other a considerable distance, are mutually inductively related to a very slight degree only, and for practical purposes, we may consider the mutual induction between the coils 1 and 3 as negligible.

In Fig. 5, vectors A and B represent the self-induced electromotive forces in the coil sections 1 and 3, respectively. Ordinarily, the vector C, which is spaced 120 degrees from the vectors A and B, would represent the self-induced electromotive force in the coil section 2, but, as above mentioned, the coil section 2, being reversely connected in circuit with respect to the coil sections 1 and 3, has its self-induced electromotive force represented by the vector D which is disposed 60 degrees from the vectors A and B, as shown, and 180 degrees from the vector C. Again, the self-induced electromotive force of the coil section 2 is smaller in value than that of the coil sections 1 and 3, because the number of turns comprising the coil section 2 is less than those comprising the coil sections 1 and 3.

A vector E, which is angularly disposed 120 degrees from the vector A, represents the electromotive force induced in the coil section 1 by the coil section 2. The resultant electromotive force impressed by the coil section 1 upon the power conductor 12 is, therefore, represented by a vector F which is disposed slightly less than 60 degrees from the vector D. Similarly, a vector G represents the electromotive force induced in the coil section 3 by the coil section 2, and the vector H, which is disposed less than 60 degrees from the vector D, represents the resultant electromotive force impressed upon the power conductor 14. Vectors J and K, disposed 120 degrees from each other and parallel to the vectors B and A, respectively, represent the electromotive forces induced in the coil section 2 by the coil sections 1 and 3, respectively. The resultant electromotive force impressed by the coil section 2 upon the power conductor 13 is represented by a vector L, which is the sum of the vector D and a vector M. In turn, the vector M is the resultant of the vectors J and K. By properly proportioning the turns comprising the coil section 2, the vectors F, H and L may be equal in length, thereby impressing equal voltages upon each of the power conductors 12, 13 and 14, respectively. Although the said resultant vectors are not disposed 120 degrees from one another, as may be seen by inspection of Fig. 5, their unequal displacement is not of such a serious nature as to have any substantial effect upon the normal operating voltages impressed upon the three-phase conductor comprising the distributing system.

While I have herein shown and described an embodiment of my invention, it will be understood by those skilled in the art that various modifications may be made without departing from the spirit and scope of my invention, and I desire that only such limitations shall be imposed as are indicated in the appended claims.

I claim as my invention:

1. The combination with a plurality of conductors comprising a polyphase system, of a set of reactance-coil units therefor which are mutually inductively related, each of said conductors being connected in circuit with a single coil unit, one of said units being reversely connected in circuit with respect to the remaining units of the set.

2. The combination with a plurality of conductors comprising a polyphase system, of a set of reactance-coil units therefor which are superposed upon, and spaced from, one another, each of said conductors being connected in circuit with a single-coil unit, an intermediate unit being reversely connected in circuit with respect to the outer units and inductively related thereto.

3. The combination with a plurality of conductors for polyphase currents, of a set of reactance-coil units therefor which are superposed upon, and spaced from, one another, each of said conductors being connected in circuit with a single-coil unit, one of said units being reversely connected in circuit with respect to the other units and inductively related thereto.

4. The combination with a plurality of conductors for polyphase currents, of a set of coil units which are superposed upon, and spaced from, one another, each of said conductors being connected in circuit with a single-coil unit, one of said units being disposed adjacent to the other units and inductively related thereto.

5. The combination with a plurality of conductors for polyphase currents, of a set of coil units which are superposed upon, and spaced from, one another, the outer and intermediate units having unequal numbers of turns, each of said conductors being connected in circuit with a single unit, the unit having the smaller number of turns being disposed adjacent to the units having the larger number of turns so as to be inductively related thereto.

6. The combination with a plurality of conductors for polyphase currents, of three coil units which are superposed upon, and spaced from, one another, the inner unit and the outer units having different numbers of turns, each of three of said conductors being connected in circuit with a single unit, the intermediate unit being inductively related to the two outer units.

7. The combination with a plurality of conductors for three-phase currents, of three coil units which are superposed upon, and spaced from, one another, the intermediate unit having a smaller number of turns than the two outer units, each of three of said conductors being connected in circuit with a single unit, the intermediate unit being inductively related to the two outer units.

8. The combination with a plurality of conductors for three-phase currents, of three coil units which are superposed upon, and spaced from, one another, the intermediate unit having a smaller number of turns than the two outer units, each of three of said conductors being connected in circuit with a single unit, the intermediate unit being reversely connected in circuit with respect to the two outer units and inductively related thereto.

9. A three-phase reactance coil comprising three superposed and spaced coil units, the middle unit being reversely connected in circuit with respect to the outer units and inductively related thereto.

10. A three-phase reactance coil comprising three superposed and spaced coil units, the middle unit having a number of turns that differs from the number of turns in each of the two outer units which have the same number of turns and are inductively related to said inner unit.

11. A three-phase reactance coil comprising three superposed and spaced coil units, the intermediate unit having a smaller number of turns than the two outer units and being reversely connected in circuit with respect thereto.

12. A polyphase reactance coil comprising a plurality of superposed and spaced coil units, each of the outer units having a number of turns that differs from the number of turns in an intermediate unit and said outer and intermediate units being mutually inductively related.

13. A polyphase reactance coil comprising a plurality of adjacent and spaced coil units, the two outer units having a larger number of turns than an intermediate unit and said outer and intermediate units being mutually inductively related.

In testimony whereof, I have hereunto subscribed my name this 23rd day of Sept., 1914.

JOHN F. PETERS.

Witnesses:
REGINALD M. CHARLEY,
B. B. HINES.